(12) United States Patent
Seuken et al.

(10) Patent No.: US 10,009,481 B2
(45) Date of Patent: Jun. 26, 2018

(54) SYSTEMS AND METHODS FOR ALLOCATING ALTERNATIVE NETWORK ACCESS RESOURCES

(71) Applicant: BandwidthX Inc., Carlsbad, CA (US)

(72) Inventors: Sven Seuken, Zurich (CH); Pertti Juhani Visuri, Fallbrook, CA (US); Randy Salo, San Diego, CA (US); Christian Van Hamersveld, San Diego, CA (US); Johanna Katariina Visuri, Solana Beach, CA (US); Dan Zagursky, San Diego, CA (US)

(73) Assignee: BANDWIDTHX INC., Carlsbad, CA (US)

( * ) Notice: Subject to any disclaimer, the term of this patent is extended or adjusted under 35 U.S.C. 154(b) by 23 days.

(21) Appl. No.: 14/586,851

(22) Filed: Dec. 30, 2014

(65) Prior Publication Data

US 2015/0189580 A1 Jul. 2, 2015

Related U.S. Application Data

(60) Provisional application No. 61/922,396, filed on Dec. 31, 2013, provisional application No. 61/922,382, (Continued)

(51) Int. Cl.
*H04J 1/16* (2006.01)
*H04M 15/00* (2006.01)
(Continued)

(52) U.S. Cl.
CPC .......... *H04M 15/80* (2013.01); *H04W 16/00* (2013.01); *H04W 36/14* (2013.01); *H04W 36/22* (2013.01); *H04L 12/145* (2013.01); *H04L 41/0896* (2013.01); *H04M 15/49* (2013.01); *H04M 15/50* (2013.01); *H04W 48/18* (2013.01)

(58) Field of Classification Search
CPC ...... H04W 36/22; H04W 28/08; H04L 5/0044
See application file for complete search history.

(56) References Cited

U.S. PATENT DOCUMENTS

| 5,426,674 | A | 6/1995 | Nemirovsky et al. |
| 6,396,816 | B1 * | 5/2002 | Astle ............... H04J 3/1682 348/14.09 |

(Continued)

FOREIGN PATENT DOCUMENTS

| WO | 2006/126062 A1 | 11/2006 |
| WO | 2013/044958 A1 | 4/2013 |

OTHER PUBLICATIONS

International Search Report and Written Opinion for related PCT Application No. PCT/US2014/072863, dated Apr. 24, 2015, in 11 pages.

(Continued)

*Primary Examiner* — Melanie Jagannathan
(74) *Attorney, Agent, or Firm* — Procopio, Cory, Hargreave & Savitch LLP

(57) ABSTRACT

A method of allocating access to alternative access networks may include: inputting, by one or more parties, needs for alternative network access and representative values for satisfying the needs; and allocating, by providers of alternative network access, alternative network access to the one or more parties based on the stated needs and values.

16 Claims, 9 Drawing Sheets

Related U.S. Application Data filed on Dec. 31, 2013, provisional application No. 61/922,376, filed on Dec. 31, 2013.

(51) Int. Cl.
*H04W 36/22* (2009.01)
*H04W 36/14* (2009.01)
*H04W 16/00* (2009.01)
  H04L 12/14 (2006.01)
  H04L 12/24 (2006.01)
  H04W 48/18 (2009.01)

(56) References Cited

U.S. PATENT DOCUMENTS

| | | | |
|---|---|---|---|
| 8,743,696 B2 | 6/2014 | Chowdhury | |
| 8,750,123 B1 | 6/2014 | Alisawi | |
| 9,001,787 B1 | 4/2015 | Conant | |
| 9,110,661 B2 | 8/2015 | Lynar | |
| 9,125,055 B1 | 9/2015 | Jones et al. | |
| 9,232,434 B2 | 1/2016 | Rong | |
| 9,325,621 B1 | 4/2016 | Ramamurthy | |
| 9,532,269 B2* | 12/2016 | Hong | H04W 76/023 |
| 2001/0032262 A1 | 10/2001 | Sundqvist et al. | |
| 2004/0165605 A1 | 8/2004 | Nassar | |
| 2004/0168088 A1* | 8/2004 | Guo | H04L 12/2859 |
| | | | 726/15 |
| 2005/0018686 A1 | 1/2005 | Igarishi | |
| 2005/0243778 A1 | 11/2005 | Wang | |
| 2005/0278262 A1 | 12/2005 | Cheliotis et al. | |
| 2006/0031444 A1* | 2/2006 | Drew | H04L 41/12 |
| | | | 709/223 |
| 2006/0073840 A1 | 4/2006 | Akgun et al. | |
| 2006/0167784 A1 | 7/2006 | Hoffberg | |
| 2007/0011080 A1* | 1/2007 | Jain | G06Q 30/06 |
| | | | 705/37 |
| 2008/0015914 A1 | 1/2008 | Jacobs et al. | |
| 2008/0062933 A1 | 3/2008 | Liu et al. | |
| 2008/0279147 A1 | 11/2008 | Hassan et al. | |
| 2009/0207824 A1 | 8/2009 | Lee | |
| 2009/0292629 A1 | 11/2009 | Lynch et al. | |
| 2010/0145161 A1 | 6/2010 | Niyato et al. | |
| 2011/0029675 A1* | 2/2011 | Yeow | G06F 11/2041 |
| | | | 709/226 |
| 2011/0237202 A1 | 9/2011 | Uemura | |
| 2011/0286437 A1 | 11/2011 | Austin | |
| 2011/0294539 A1 | 12/2011 | Shin et al. | |
| 2011/0320588 A1 | 12/2011 | Raleigh | |
| 2012/0142382 A1 | 6/2012 | Stanforth et al. | |
| 2012/0230191 A1* | 9/2012 | Fang | H04W 36/22 |
| | | | 370/235 |
| 2012/0238287 A1 | 9/2012 | Scherzer | |
| 2012/0303788 A1* | 11/2012 | Heinrich | H04L 45/121 |
| | | | 709/223 |
| 2012/0303829 A1 | 11/2012 | LaFrance | |
| 2013/0070594 A1 | 3/2013 | Martin et al. | |
| 2013/0089056 A1* | 4/2013 | Iwai | H04W 72/042 |
| | | | 370/329 |
| 2013/0152168 A1 | 6/2013 | Nasir et al. | |
| 2013/0176952 A1* | 7/2013 | Shin | H04L 5/001 |
| | | | 370/329 |
| 2013/0301609 A1 | 11/2013 | Smith et al. | |
| 2013/0311778 A1 | 11/2013 | Cherukuri | |
| 2013/0322329 A1 | 12/2013 | Visuri | |
| 2013/0322401 A1 | 12/2013 | Visuri et al. | |
| 2013/0324104 A1 | 12/2013 | Cavilla | |
| 2014/0031029 A1 | 1/2014 | Rajagopalan | |
| 2014/0036691 A1 | 2/2014 | Madan | |
| 2014/0295825 A1 | 10/2014 | Chuang | |
| 2014/0341109 A1 | 11/2014 | Cartmell | |
| 2015/0215816 A1 | 7/2015 | Abou-Elkheir | |
| 2016/0227471 A1 | 8/2016 | De Foy | |
| 2016/0295412 A1 | 10/2016 | Peterson | |

OTHER PUBLICATIONS

International Search Report and Written Opinion for related PCT Application No. PCT/US2014/072864, dated Apr. 13, 2015, in 14 pages.

International Search Report and Written Opinion for related PCT Application No. PCT/US2014/073000 dated Apr. 21, 2015, in 12 pages.

International Search Report and Written Opinion for related international application No. PCT/US2016/054434, dated Jan. 24, 2017.

European Search Report dated Nov. 3, 2017 for related EP Patent Application No. 14876771.8.

European Search Report dated Oct. 27, 2017 for related EP Patent Application No. 14876245.3.

\* cited by examiner

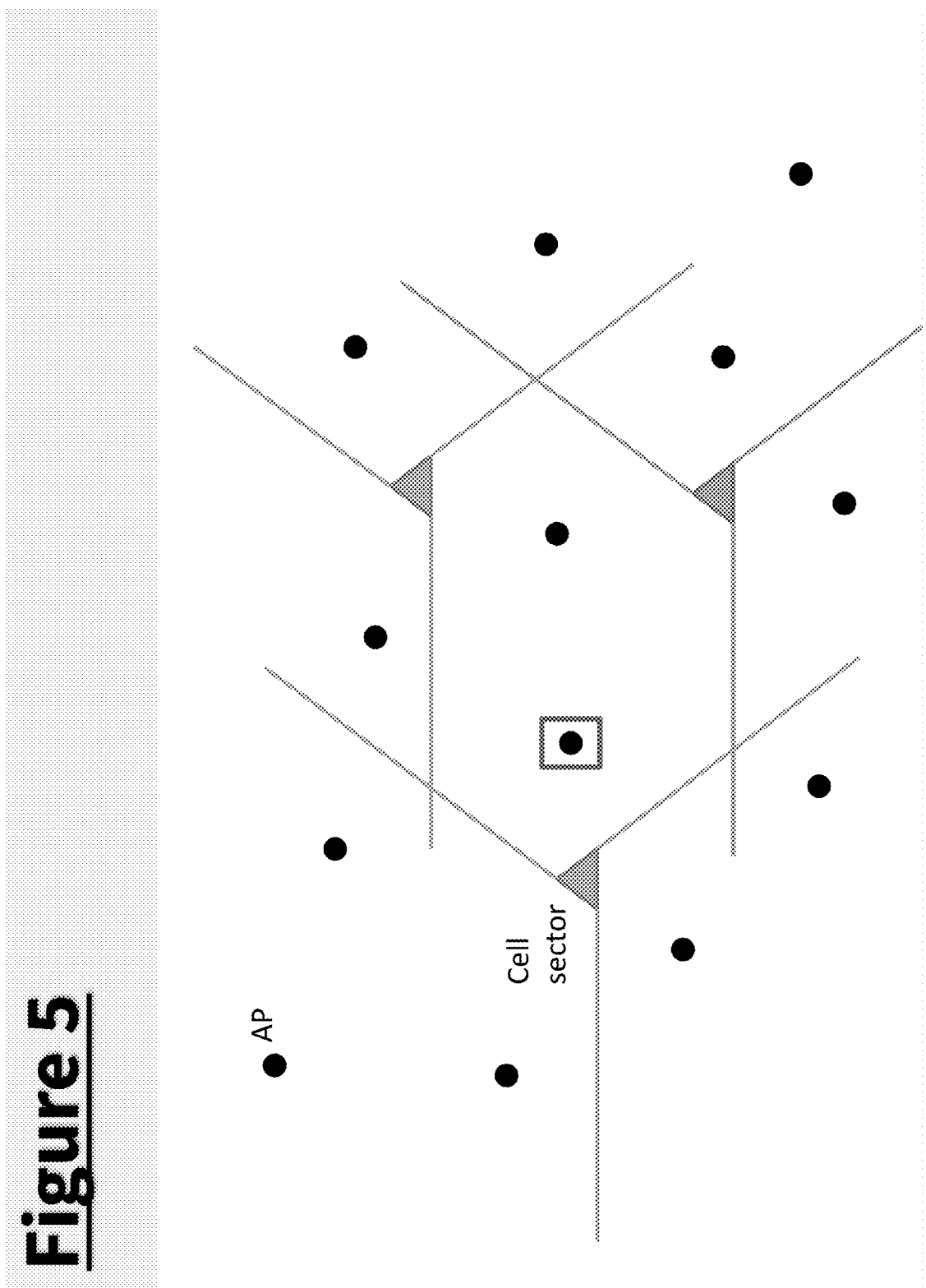

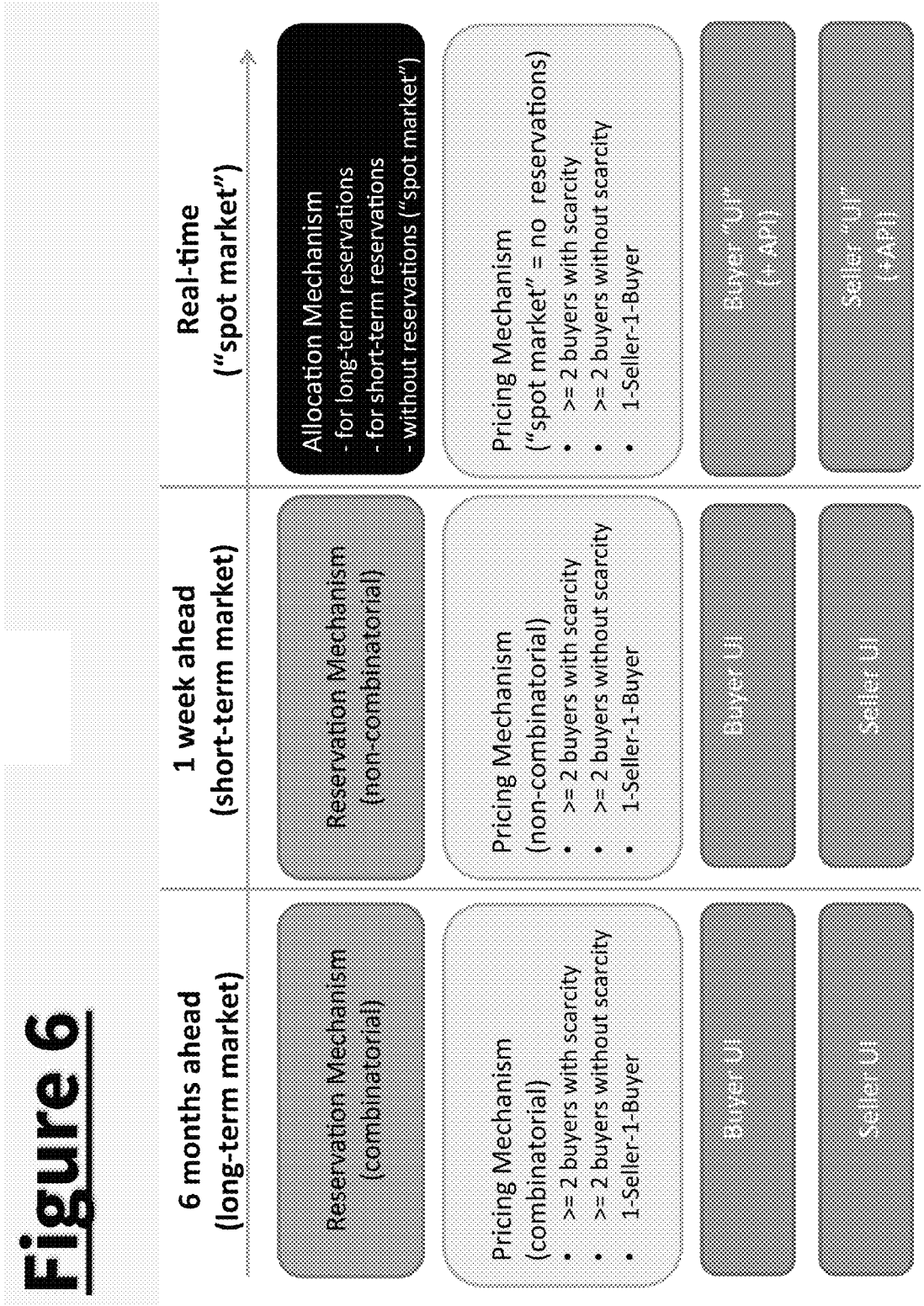

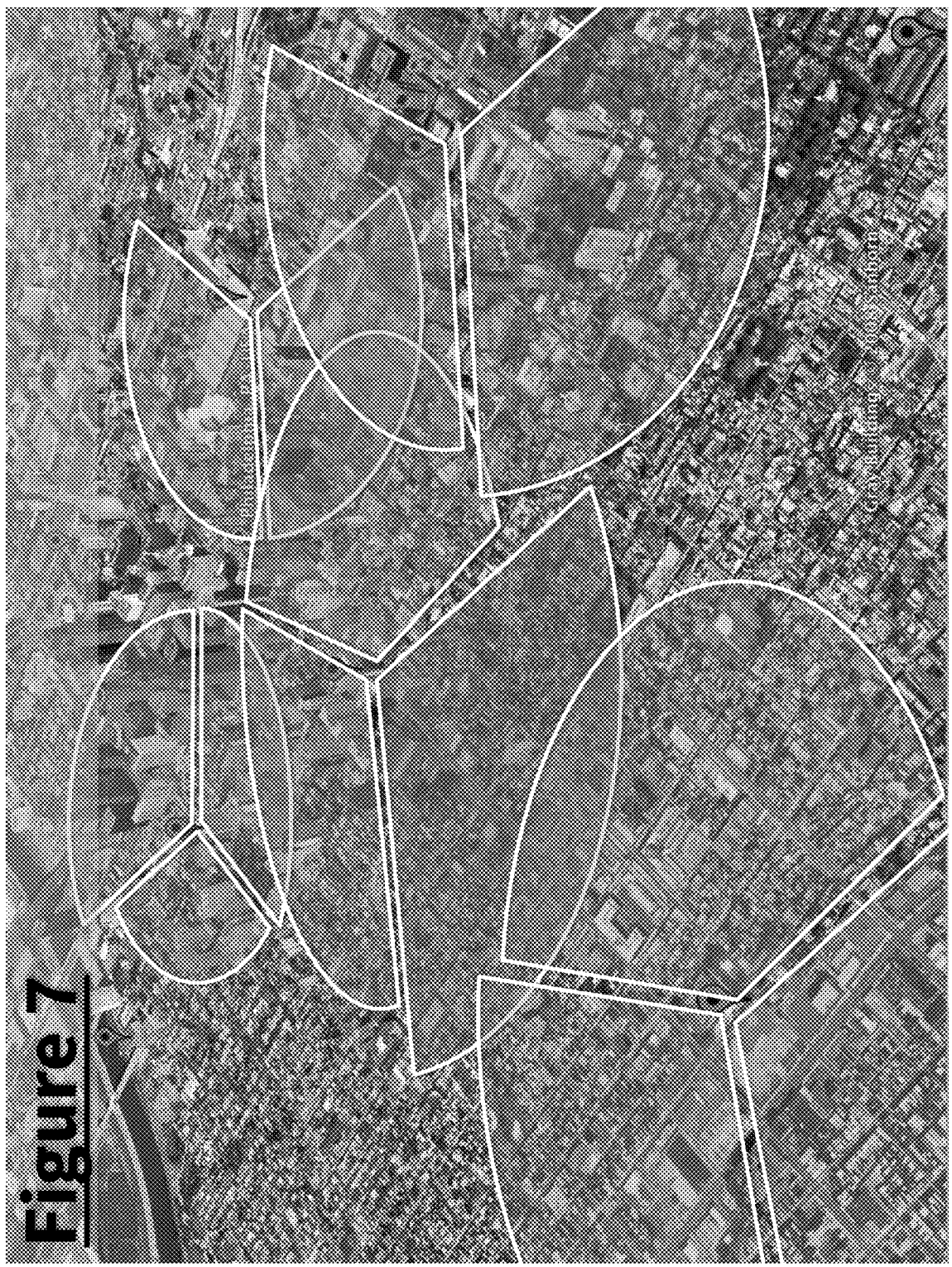

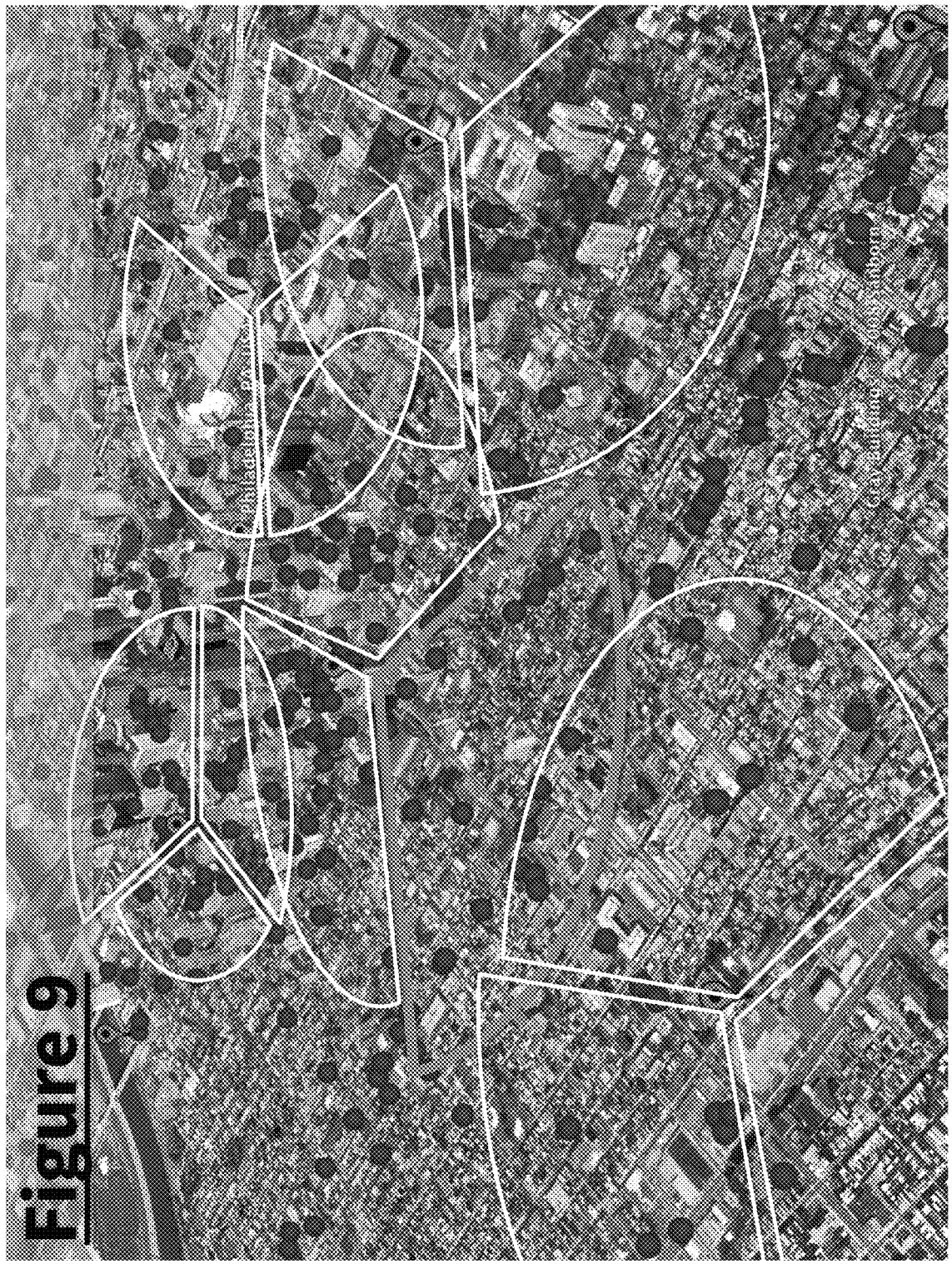

SYSTEMS AND METHODS FOR ALLOCATING ALTERNATIVE NETWORK ACCESS RESOURCES

CROSS-REFERENCE TO RELATED APPLICATION(S)

This application claims the benefit of U.S. Provisional Application No. 61/922,396, filed Dec. 31, 2013, U.S. Provisional Application No. 61/922,382, filed Dec. 31, 2013, and U.S. Provisional Application No. 61/922,376, filed Dec. 31, 2013, the disclosures of which are incorporated herein in their entireties by reference.

BACKGROUND

Related Field

The subject matter discussed herein relates generally to wireless service to mobile devices and, more particularly, to allocation of resources on alternative radio access networks that can be used to service mobile devices.

Background

Mobile devices generally rely on wireless service provided by a service provider using cellular communications that utilize radio frequency communication.

Data communications to mobile devices can also be provided over other types of radio access networks. For example, Wi-Fi access points connected to broadband networks provide data to mobile devices. The choice of whether data communication takes place over a cellular network or a Wi-Fi connection is normally left to the end user of the device. If the end user has entered all necessary passwords and access credentials to the mobile device memory and the Wi-Fi radio is on, in many cases the connection to Wi-Fi is preferred automatically by the mobile device.

In U.S. patent application Ser. No. 13/684,044 (filed Nov. 21, 2012), Ser. No. 13/684,048 (filed Nov. 21, 2012), Ser. No. 13/684,049 (filed Nov. 21, 2012), 61/805,473 (filed Mar. 26, 2012), 61/805,476 (filed Mar. 26, 2012) and 61/877,178 (filed Sep. 12, 2013) methods are described for alternative network access (ANA) based on methods and systems for selecting the radio access network to provide Internet or other network access based on terms and conditions for allowing access and terms and conditions for utilizing access to the alternative network. Each of those applications is hereby incorporated by reference in their entirety.

In practice the terms and conditions for utilizing access to alternative networks often depend on the expected or the actual load on the primary network managed by the service provider for the device. For example, if the primary network access takes place through the cellular network system owned by the service provider for the device, it is likely that the service provider first wants to utilize all of the capacity in its own network before seeking to use capacity from an alternative network. This is especially the case if there is a cost associated with using the alternative network access.

This application describes a methodology for allocating access to resources represented by the access points of the alternative network access provider or several providers in a situation where one or more mobile network operators and zero or more other parties interested in access to the same resources through the same access management system

BRIEF DESCRIPTION OF THE DRAWINGS

Aspects and features of the present inventive concept will be more apparent by describing example embodiments with reference to the accompanying drawings, in which:

FIG. 5 illustrates how a Wi-Fi access point may be simultaneously in several cellular sectors;

FIG. 6 illustrates the three different time horizons in the overall market design of the system for allocating capacity;

FIG. 7 is an illustration of cellular sectors in an urban area;

FIG. 8 illustrates locations of Wi-Fi access points in the city environment of FIG. 7; and FIG. 9 illustrates an example of how conventional cellular sectors and Wi-Fi access point locations in an urban area are related to one another.

DETAILED DESCRIPTION

Figure 1:
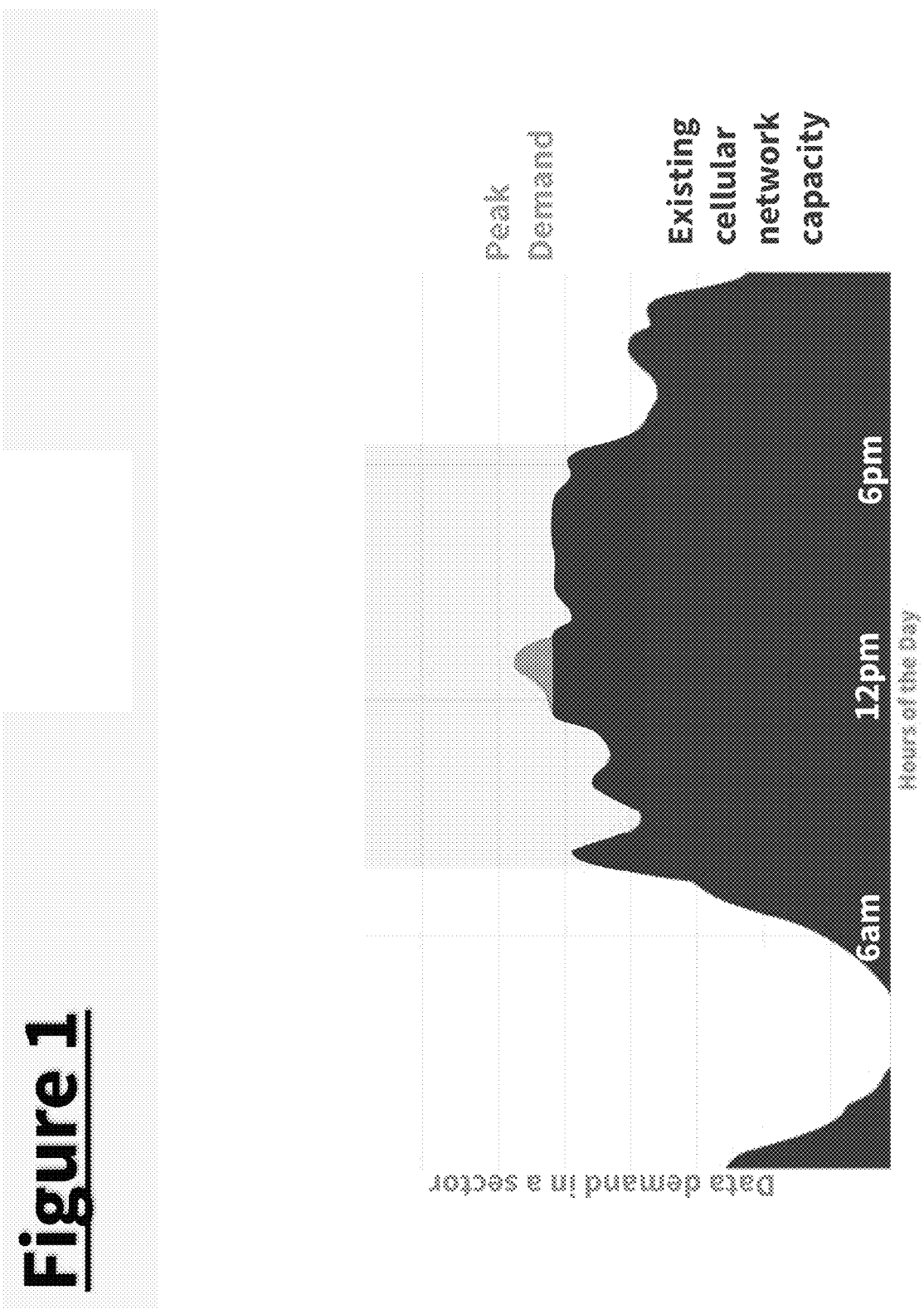
FIG. 1 illustrates a typical variation of data usage during the hours of a day in a cellular sector during business days in a downtown business district and an example of peak demand exceeding the cellular network capacity.

The subject matter described herein is taught by way of example implementations. Various details have been omitted for the sake of clarity and to avoid obscuring the subject matter. The examples shown below are directed to structures and functions for implementing systems and methods for establishing wireless connections based on access conditions. Other features and advantages of the subject matter should be apparent from the following description.

In U.S. provisional patent application titled SYSTEMS AND METHODS FOR MANAGING OFFLOAD FROM ONE RADIO ACCESS NETWORK TO ANOTHER, filed concurrently herewith, a system and method is described to manage offload of traffic to a system of alternative network access points based on and offload profile established by mutual agreement between the primary mobile network operator and the provider of alternative network access. That application is incorporated herein by reference in its entirety.

As communication needs of various wireless and mobile devices have grown, many of them have been equipped with more than one radio system. Each of the radio systems may be used to connect to one or more wireless networks based on the system protocols. Examples of such systems are a cellular radio system that may be utilizing a GSM, CDMA or LTE standard for encoding the signal and a Wi-Fi system that utilizes a well-known IEEE 802.11 standard for communication. Another example may be a WiMAX system that is based on the IEEE standard 802.16.

In a communication device that has multiple radio systems, each of the radios may have different characteristics. For example, the cellular system may be designed to connect to cell towers that are further apart and use a higher power signal than the Wi-Fi radio system uses. Since the Wi-Fi standard is utilizing unlicensed spectrum, the power of the transmitter may be limited by regulation and consequently the distance over which the communication can effectively take place may be shorter than the effective communication distance in the case of a cellular connection.

The different characteristic of the radio systems may result in a topology of coverage in the environment that is very different for each radio access network. For example, in the cellular system a single radio may be covering an area ranging from hundreds of meters across to a few kilometers, with typically one square kilometer or more of surface area for a cellular sector. In comparison, a Wi-Fi system that is based on using unlicensed radio bands and therefore limited in the power of the signal may cover only an area of 50 meters to 100 meters across.

The end result of the relatively high penetration of broadband access, high prevalence of Wi-Fi access points as the termination points on broadband connections, and the sparse and intermittent use of these Internet connections is tremendous unused wireless network access capacity available in most urban and suburban areas. This capacity is owned and controlled by broadband service providers. In most cases the broadband service providers are different companies than the mobile network operators. Therefore in most cases the access points are not available for alternative network access to the mobile devices that primarily use cellular networks for accessing the Internet.

As the overall usage of data by mobile devices continues to grow, more devices, connected to a particular cell sector radio will attempt to use more data at higher frequencies. Over time, this means that the maximum capacity of data traffic at the cellular radio will be reached. Initially, this may happen only during peak usage times. These peak times are typically very regular and occur during business days during the same hours every day. The actual pattern of usage may be different at different locations. For example, in downtown business districts the peak usage may take place during the morning and evening commute hours and during lunchtime. In suburban residential areas, the highest usage normally occurs during the evening hours.

FIG. 1 illustrates a typical variation of data usage during the hours of a day in a cellular sector during business days in a downtown business district and an example of peak demand for data capacity (i.e., demand) exceeding the cellular network capacity.

Since the mobile network operators occasionally need additional capacity in some locations and broadband network operators with Wi-Fi access to the network often have capacity that is not being used, the broadband network operators may become providers of alternative network access to the mobile network operators. However, allocating the resources of these alternative network access points to possibly several mobile network operators that may wish to use them at the same time is not a trivial problem.

Figure 2:
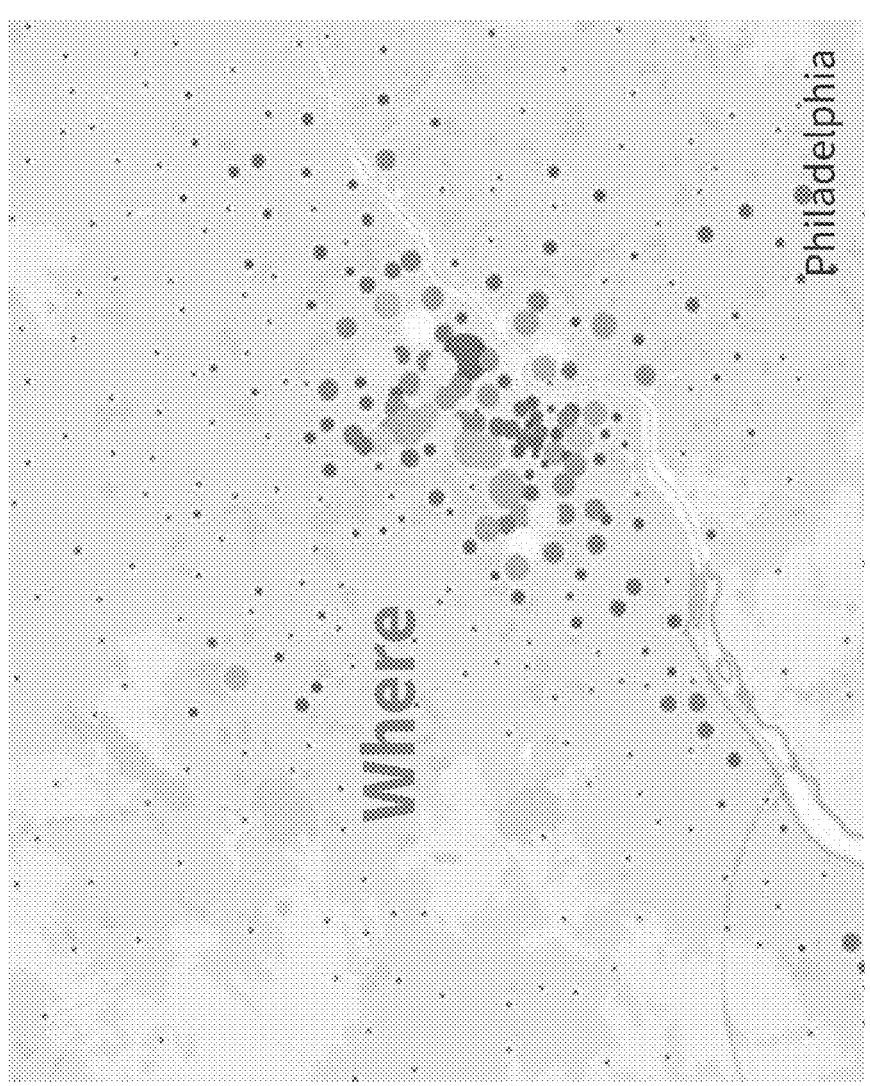
FIG. 2 illustrates an example of the non-uniformity of data demand across several towers of a single mobile network operator in and around of a metropolitan area.

The cellular network system of a mobile network operator typically includes thousands or tens of thousands of cellular sectors and small cells. The distribution of data demand is uneven across the various cell sites and cellular sectors. FIG. 2 illustrates an example of the non-uniformity of data demand across several towers of a single mobile network operator in and around of a metropolitan area. The sizes of the dots in FIG. 2 indicates the total demand during the busiest hour of the day at each cell site.

As can be seen from the dot sizes, at the time of the measurement only a few cell sites had very high demand and would have benefited from additional capacity. During normal operation only a few percent of the cell sites are typically in need of additional capacity. Mobile network operators normally address the capacity shortages by investing in additional equipment, taking on rental costs, and paying for additional backhaul for routing the traffic to the Internet or the cellular operator's network system. By always expanding capacity at the locations most in need of expansion the operators keep up with demand. As a result, those are the locations where additional capacity would need to be shifted around in the network.

Figure 3:
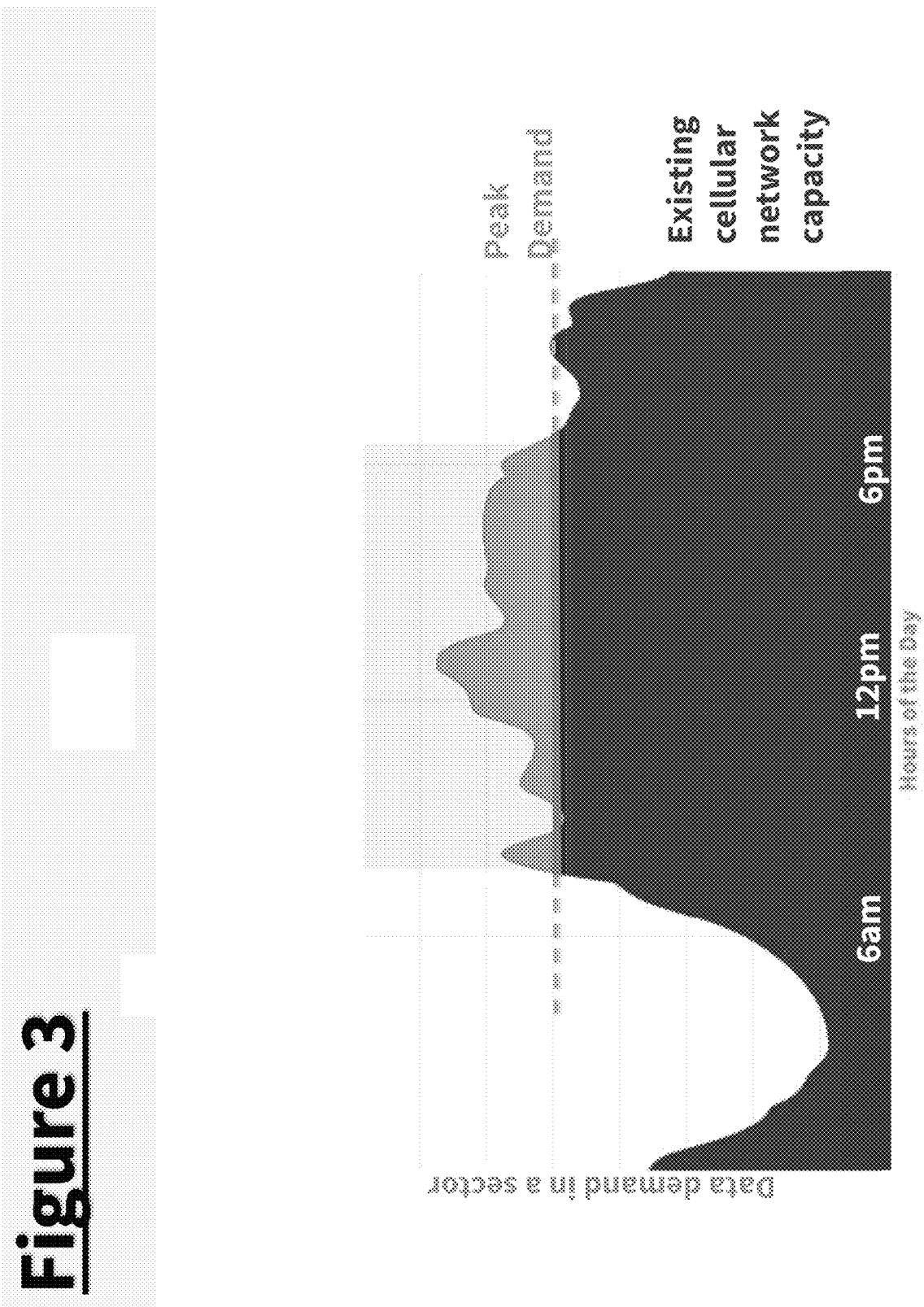
FIG. 3 is an illustration of the projected data traffic load during the hours of a day in the sector depicted in FIG. 1 six months later than the situation in FIG. 1.

Cellular network operators accumulate large amounts of information of usage patterns in their networks. This information is normally used to plan for network expansions in order to keep up with the growing demand. For example, by analyzing the collected information about use of cellular data in a particular sector represented by FIG. 1, and applying straightforward trend extrapolation and other forecasting methods, a cellular operator may conclude that within six months data usage in the same sector will look like a pattern shown in FIG. 3.

Assuming that the network operator has not increased the capacity of the cellular network, it would be desirable for the mobile network operator to gain access to alternative network capacity for mobile devices within this cellular sector to make up for the shortfall in capacity.

Figure 4:
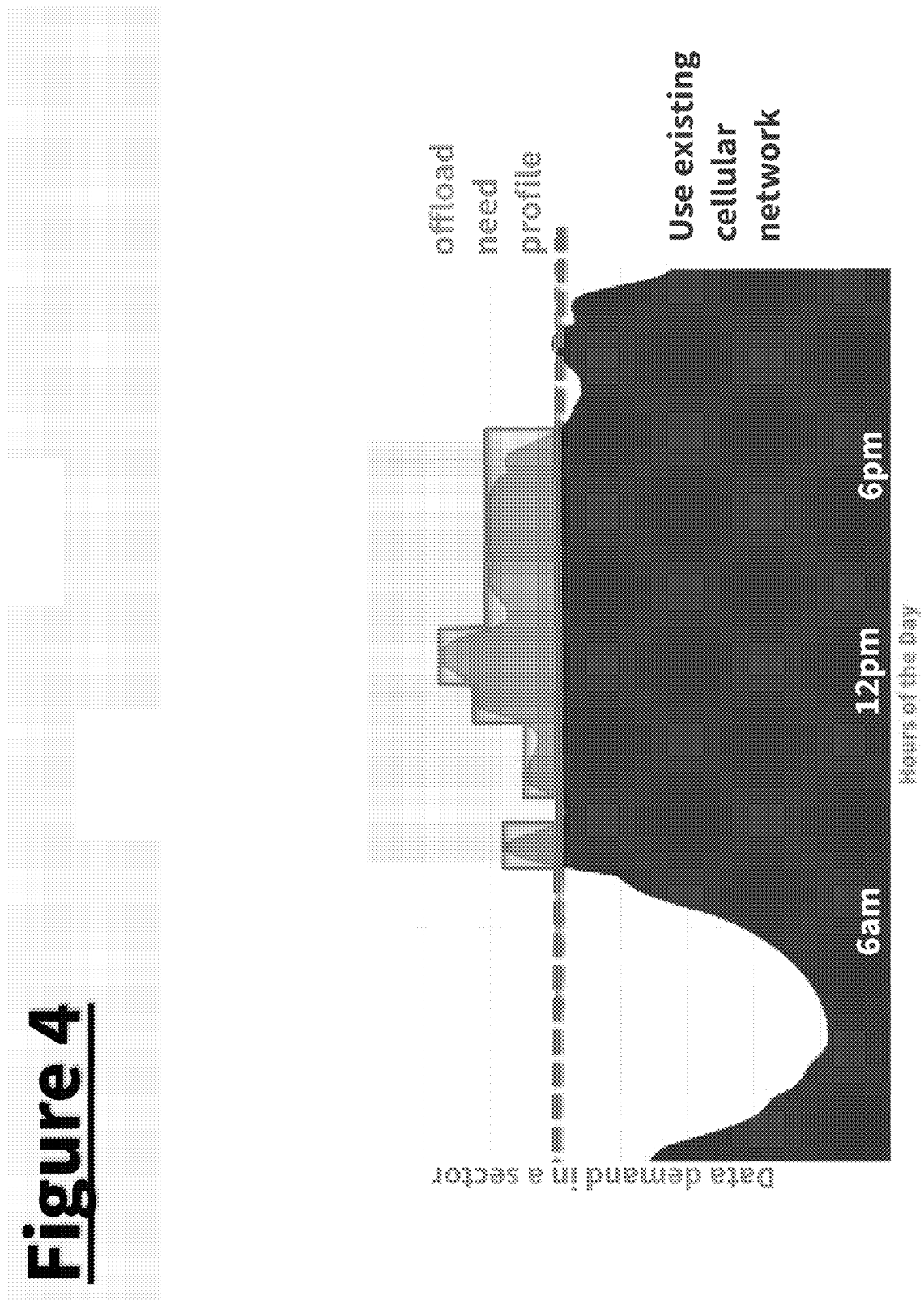
FIG. 4 illustrates the desired offload profile as defined by the mobile operator based on the projection shown in FIG. 3.

In most cases, the need for alternative network capacity in each sector would vary by the hours of the day. In an ideal case, the mobile network operator would offload data traffic during each hour (or other shorter time period) of the day exactly in the amount needed to make up the difference between the existing cellular network capacity and the data capacity demand during each hour. FIG. 4 illustrates the anticipated hourly data traffic offload need profile of the mobile network operator in case of the projected load illustrated in FIG. 3.

If there are several mobile network operators in need of additional capacity at the same time that could be provided by the same alternative network access points, there is a need to allocate the network capacity in the most efficient way. This need for efficient network capacity allocation may also include the need for providing some network capacity for other parties that may not be mobile network operators. These parties may include mobile virtual network operators as well as other providers of content and mobile device services. These parties may wish to use the access provided by the alternative network access points.

The following system description explains a method and system to allocate data traffic capacity from a network or from several networks of access points to several potential users of the data capacity that may include both mobile network operators and other parties.

Method and System for Allocating Access—Market Design

In this document, we describe a method for allocating access in the above-described complex situation. The method may utilize a mechanism known as market design.

In the following discussion, "buyer" refers to all the parties that wish to use capacity from the alternative network provider. In a similar way, "seller" refers to the alternative network provider.

The market design may consist of rules/mechanisms/algorithms that specify how resources are allocated. In particular, the market design addresses two questions:

1) "Who gets what?", meaning "Which mobile network operator (MNO) is permitted to offload how much of its demand in which location, and at what time and via which access point of which alternative network access provider?" In a simplified way, one could say that shares of wireless access points are allocated to an MNO's data traffic. This is a complicated problem because the supply and demand of resources is location-specific and time-specific.

2) "For what price?" For each allocation decision (i.e., who gets what), a corresponding price may be computed. In particular, for each transaction (i.e., each MNO's data traffic offloaded via an access point), the buyer (i.e., the MNO) needs to pay the seller (i.e., the ISP) a certain amount of money.

Two types of buyers may be distinguished:

1) Mobile Network Operators (MNOs) are companies that offer mobile telephony services including mobile data. Examples of MNOs are companies such as AT\&T, Verizon, T-Mobile, Sprint, etc, that have nation-wide cell phone networks. Examples of MNOs in Europe are Orange, EE, Vodafone, Deutsche Telecom etc. In addition, there are several smaller operators that have their own network equipment. These companies are referred to as facilities based operators.

2) Mobile Virtual Network Operators (MVNOs) are essentially re-sellers of mobile services (i.e., companies that do not own a nation-wide cell phone network) themselves (some may have their own network in some cities, where they would be facilities based, but are roaming on networks of the nationwide carriers elsewhere). Thus, MVNOs generally do not incur costs for expanding their networks. Instead, MVNOs may have roaming agreements with one or more MNOs (i.e., the MVNOs pay the MNOs for using the MNO networks). In the simplest case, these agreements specify a fixed price per gigbit (GB). MVNOs may also include other parties that may be interested in using alternative network access from the sellers, but who do not have their own facilities to provide network access to the mobile devices that they wish to serve.

Each MNO may maintain thousands (e.g., up to 100,000 per MNO) of cell towers. In total, the MNOs have about 300,000 cell towers in the US, serving 300 million customers. Thus, one cell tower may serve approximately 1,000 customers.

A typical cell tower may cover a substantially circular region (i.e., a cell tower covers 360 degree) with a certain radius ranging from a few hundred meters to a few kilometers, depending on location. Most cell towers have three radios, each serving a 120 degree region (i.e., a sector). Each radio has a maximum bandwidth capacity measured in MBit/s (e.g., 10 MBit/s). Data traffic bottlenecks (i.e., data traffic exceeds network capacity) may occur at individual radios (i.e., in individual sectors). Thus, buyers are interested in offloading some of their data traffic in a particular sector where the traffic temporarily exceeds the available capacity.

The market design problem is complicated because it does not deal with a simple commodity (e.g., oil, gas, wood, etc.), but instead, the demand and supply of resources is highly location-dependent (e.g., bandwidth available in Chicago cannot be used to offload traffic in New York City) and time-dependent (e.g., bandwidth available at 3:00 pm cannot be used to satisfy the demand at 1:00 pm). Two additional complications add to the complexity:

Different MNOs may not agree on what constitutes "a single location." In particular, a sector of one MNO may not be congruent with a sector of another MNO. Instead, each MNO may have its own towers serving sectors that intersect in arbitrarily complicated ways.

Each access point (AP) is at one distinct geographical location (e.g., xy coordinates). However, even the sectors of a single MNO may overlap (e.g., two neighboring sectors from the same tower as well as sectors from different towers). Thus, with respect to the MNOs' sectors, the AP's relative location may be ambiguous. Most APs will be in three different sectors of the same MNO. Accordingly, a mobile device in the vicinity of a particular AP may be connected to any one of three different radios of the same MNO, some of which may be overloaded and some of which may be not be overloaded. FIG. 5 illustrates how a Wi-Fi access point may be simultaneously in several cellular sectors.

In order to allocate capacity in an optimal way between several parties that may need it, it is important to understand what value each party derives from access to the capacity. One way in which value accrues to MNOs is by postponing network expansion expenses. The actual cost of expanding the capacity of a particular cell sector varies depending on local circumstances, availability of unused spectrum, etc. The cost may be adding a radio, splitting a cell sector, or adding a small cell in the footprint of the macro cell, or in some cases it may be building a new cell tower.

The total cost of cellular network expansion in the USA is about $30 billion and the addition to ongoing operating costs each year is about $10 billion. The capital cost varies from $15,000 for a new small cell to the cost of a new tower costs on the order of $250,00. Additionally, expansion adds to operating expenses every month about $1,000 to $3,000 (for rent, utilities, backhaul, permit, etc.). Thus, every day that an MNO can defer network expansion is worth a certain amount of money to the MNO (e.g., $1,000 to $3,000 per sector per month).

Consider an individual sector where traffic is about to exceed available capacity. If the MNO can offload all of the excess demand from that sector, then the MNO may be willing to pay up to $3,000 per month, or up to $100 per day, for that service. This is the buyer's value for offloading all of its excess data traffic for one day. Note that it takes MNOs between three and six months to implement a network expansion (from planning to operation). Thus, if the MNOs want to postpone building a new tower, they will need to make reservations on the alternative network access market approximately six months ahead of the time where they actually need to offload the traffic.

Three important remarks: 1) Value is independent of traffic. The value that the MNO assigns to the ability to offload all of its excess demand for one day is independent of the actual amount of excess demand, because it is driven by the costs for expanding the capacity the MNO owns. Traditionally, value has been thought of in terms of a certain value in dollars per GB. However, for a facilities based operator value may be determined by "dollars for offloading all excess demand in one sector for one day."

2) Buyer has combinatorial preferences. Because the MNO's value is driven by the money saved by not building a new tower, the MNO only has value for offloading data traffic if it is able to offload all of its excess demand. If only a portion (e.g., 50%) of its excess demand can be offloaded, then it may be necessary to build a new tower anyway; offloading only a portion of its excess demand has no value. Thus, the MNO has combinatorial preferences over the course of one day.

Consider FIG. 4, where a typical traffic pattern in a sector is shown. Most of the day, the traffic is less than the sector's capacity. However, during peak hours the traffic temporarily exceeds capacity. Assume that even temporarily exceeding the supply is unacceptable for this MNO in this sector. The MNO's preference is to offload exactly the peak demand. Only if all of its demand is satisfied, then the MNO does not need to expand its own capacity. Thus, the MNO only has value for offloading this data traffic if all of its data traffic is offloaded.

3) Reserving APs is a combinatorial optimization problem. To satisfy the offloading needs of a single MNO in a single sector, many APs in that sector will be needed. The APs may all belong to the same seller or to different sellers. Each access point will have a different supply at different times of day. Moreover, there will be different amounts of traffic by customers of the MNO around a particular AP (i.e., in the vicinity of a particular AP) such that only a limited amount of traffic can be offloaded via each AP. Reserving enough supply at each AP to guarantee that the MNO will be able to offload all of its excess demand is a combinatorial optimization problem different than the combinatorial preferences of the buyer.

A second way in which value accrues to MNOs is via churn reduction and an increase of customer loyalty. Even if the demand in a sector sometimes exceeds the available capacity, an MNO cannot expand capacity immediately in every location where this is the case. Instead, a certain excess demand is tolerated, and only the worst cases are fixed over time. Yet, excess demand always means that the customers temporarily have a bad user experience, which leads to customer churn (i.e., customers switch their provider as soon as possible) and decreased customer loyalty (customers switch their provider the next time they have the opportunity). Both of these effects have a direct negative impact on the MNO's profits.

To counter this, an MNO wants to offload its excess demand even if it cannot offload all of its excess demand. Thus, this value is explicitly not combinatorial. This is the traditional way MNOs think about their value for offloading traffic. In this case, the MNO's value is measured in dollars per GB. To accrue this value, the MNO does not need to buy reservations 6 months ahead. The MNO may buy a reservation a few weeks ahead, or it can even try to buy some bandwidth in real-time as the demand happens.

The preferences of the MVNOs are simpler because they do not need to compare buying capacity to the cost of expanding capacity of their own facilities. Thus they do not have combinatorial preferences. Furthermore, they have a clear outside option, namely the price per GB, which they must pay to the MNOs according to a roaming agreement. This outside option is subject to the performance of the MVNO's host MNO network. If the host MNO network is overwhelmed by excess demand, the MVNO may suffer from poor service along with the subscribers of the host MNO.

Ideally, MVNOs would like to offload all of their traffic, assuming that the price they must pay in our market is lower than the price of their roaming agreement (and ignoring, for now, minimum traffic agreements, etc.). Thus, as their value, the MVNOs may just report the price they normally pay to MNOs in dollars per GB. The MVNOs' demand (i.e., how much they want to offload) is equal to their actual data traffic. If an MVNO wants to buy reservations ahead of time, the MVNO needs to estimate its own demand to make sure it does not buy more reservations than it will eventually need. The MVNO can also buy in real-time according to its current data traffic. The situation with other possible parties interested in using alternative network access is assumed to be similar to the MVNOs, but the value of their access may depend on a number of parameters and therefore may vary over time and location.

Market Design Overview

Before describing the market design, we briefly discuss the different design goals.

A) Efficiency vs. Revenue: The efficiency of the market is the total welfare that the market generates compared to no trade taking place. In contrast, the revenue is the sum of all payments that buyers make to sellers. In general, efficiency and revenue cannot be maximized simultaneously. There are benefits to maximizing efficiency, but in some situations efficiency may be sacrificed to obtain good incentive properties or to generate sufficient revenue.

B) Approximate "Strategyproofness": A market mechanism is strategyproof if the players are best off to report their true value to the market, no matter what the other players report. Ideally, we want to design mechanisms that are strategyproof as this has a number of positive implications: It is simple for the buyers and sellers to participate in the mechanism. They simply report their true preferences and the market takes care of computing "fair" prices.

For the market to maximize efficiency, it usually needs to know the buyers' true preferences. If buyers have an incentive to misreport their preferences, then it is more likely that the market will choose an inefficient outcome.

In general, in our domain we may not always be able to achieve full strategyproofness. Instead, we will be striving for "approximate strategyproofness" such that agents are almost always best off to report truthfully.

Note that this idea of a strategyproof mechanism is different from how the industry has traditionally been thinking about these markets. Usually, people imagine sellers submitting asks, and buyers submitting bids, like at a stock market, such that trade happens when a bid is submitted that is higher than an ask. Our mechanisms will work differently.

C) Individual Rationality: This property simply guarantees that no player that enters a particular market will end up with negative utility. We may generally be able to guarantee this.

D) Simplicity for Buyers and Sellers: In designing our markets, we need to consider how buyers and sellers report their preferences to the market mechanism. They must either enter their values via a user interface (UI), or via an API. In either case, it should be relatively simple for buyers and sellers to express their preferences, because otherwise the players may hesitate to join the market. In designing our market, we have paid particular attention to the design of a compact and succinct yet expressive bidding language for the players.

E) Computational Scalability: In the long-run, we are dealing with a huge market, with millions of sectors and tens of millions of APs (in the global market). A significant factor in considering the computational scalability is that, even though the total number of sectors and APs is large, the actual activity is always local (more about this later). This lends itself to a parallel processing approach that will limit the need for solving very large computations.

Nevertheless, the algorithms that compute the reservations/allocations and prices in this market should scale to large enough problem sizes and terminate (i.e., produce a solution) within a sufficiently short time. For our long-term and short-term markets, this usually means we need to compute reservations and prices within 1 day. For the real-time market, the allocations should be computed within one second. The prices may also be computed within one second, but delayed pricing may also be used.

Three Time Horizons

An example of our market design consists of three individual markets, corresponding to three different time horizons (see FIG. 6). For each market, there are four components:

1) Reservation/Allocation Mechanism: The reservation mechanism for the long-term and short-term markets and the allocation mechanism for the spot market determine who gets what. Thus, depending on the submitted preferences of buyers and sellers, these mechanisms only determine the allocations.

2) Pricing Mechanism: Given the allocations computed by the reservation/allocation mechanisms, the pricing mechanisms compute the prices.

3) Buyer UI: For each market, we need a user interface (UI) that allows the buyer to specify preferences in terms of particular value and demand. The UI may be different for each of the three markets.

4) Seller UI: We also need a UI for the seller to express his preferences (i.e., available supply and potentially reserve prices).

The three markets with different time horizons are the long term, short term and spot market.

The long-term market is the market that gives the buyers the opportunity to buy reservations six months (or some other sufficiently long time ahead of the date they need the capacity) ahead of the time when they actually need them. If buyers do not get the reservations they need (e.g., because not enough supply is available or because the competition with other buyers is fierce and other buyers have won), then the buyers still have time to start building a new tower. As explained above, the MNO's values are combinatorial in the long-term market (because they only have value if they can offload all of their excess demand). However, the MVNO's values are not combinatorial (i.e., any traffic they can offload is good for them). Our market will be able to handle both MNOs and MVNOs, and allocate bandwidth optimally using combinatorial optimization (i.e., mixed integer programming). The output of the "combinatorial reservation mechanism" will be reservations at individual access points that correspond to individual buyers' sectors.

There also needs to be a short term market. Even if the buyers have already bought reservations in the long-term market, five months later their actual excess demand in a particular sector may be different from what they had predicted. Thus, the short-term market gives them the opportunity to buy additional reservations. The short-term market differs from the long-term market mainly in that the MNOs no longer have combinatorial preferences (it is too late to build a tower anyway). Thus, their preferences are now analogous to the MVNOs' preferences (i.e., they can be expressed in $/GB). The same reservation mechanism is used for the short-term market as in the long-term market (i.e., taking care of the combinatorial optimization, combining many different APs in one sector).

Finally, the real-time or "spot" market is the market that happens in real-time. Here, buyers no longer buy "reservations," but instead they are directly "allocated," which is why this market needs an allocation mechanism instead of a reservation mechanism. This real-time allocation mechanism takes the reservations from the long-term and short-term market into account as well as the demand expressed by the buyers for the real-time market. It is generally based on terms and conditions for allowing access set by the sellers being matched with terms and conditions for utilizing access set by their buyers.

Combinatorial Reservation Mechanism

For the long-term and short-term market there is a need for making decisions about how much capacity each of the buyers will get from each of the access points of the sellers. In order to understand the mechanism for making these decisions, we will first look at the topology of the primary network and each relation to the access point topology of all the alternative network access systems.

A cellular radio access network is normally engineered for ubiquitous coverage. This means that cell sites are placed at distances where the coverage of each sector slightly overlaps with the coverage area of the adjacent sector. A typical layout of cellular sectors in an urban area is illustrated in FIG. 7. This is a simplification of the actual situation in many cellular access networks. Often, in addition to macro cell sites and their associated sectors, there may be small cells with shorter range. These small cells may also have sectored radio systems. However, in the aggregate, cellular systems are engineered for ubiquitous coverage.

Wi-Fi access points are typically deployed to meet the needs of the subscriber to the broadband connection to which the access point is connected. There are also Wi-Fi access point deployments that are intended for third parties or the general public. These are often called hotspots. In either case the Wi-Fi access points that may be available for offloading are located in various places throughout the environment and their coverage may or may not be ubiquitous.

These access points constitute the alternative network access discussed in this document. Typically there are several access points that can provide alternative network access within the area of each cellular sector. FIG. 9 illustrates an example of how conventional cellular sectors and Wi-Fi access point locations in an urban area are related to one another. The same phenomenon was illustrated from a different perspective in FIG. 5.

In order to understand the constrains and allocation mechanism the following are the indices used in the equations that express the constraints:

Sets and Indices:

i∈I, indexing MNOs, and i∈I', indexing MVNOs j∈J, indexing the sectors (individually per MNO/MVNO)

s∈S, indexing sellers a∈A, indexing APs k∈K={0, 1, . . . 23}, time slots in a day The following are the parameters and their units:

Parameters [Units]:

$D_{ijk}$ [Mbits/s], offloading demand from MNO/MVNO i in sector j for slot k;

$$D_{ij} = \sum_{k \in K} D_{ijk}$$

$S_{ak}$ [Mbits/s], (predicted) supply available at access point a in time slot k $$T_{ijak} \left[ \frac{Mbits}{s} \right],$$

(predicted) traffic from MNO/MVNO i in j "around" AP a in timeslot k (offloading potential)

$F_{ijk}$ [Mbits/s], capacity downwards tolerance ("fudge factor)" by MNO i in its sector j in time slot k $V_{ij}$[$], value of MNO i for sector j for offloading all of its demand during the whole day in this sector $V_i'$[$/GB], value of MVNO i for offloading 1 GB (in any sector at any time)

$B_{ijak}^T \in [0, 1]$, volatility buffer to "discount" the traffic from i in sector j in timeslot k around AP a $B_{ak}^S \in [0, 1]$, volatility buffer to "discount" the supply from access point a in timeslot k L [seconds], length of one time slot (e.g., 3,600 seconds=1 hour)

The variables in the system and their units are:
Variables [Units]
$x_{ij} \in \{0,1\}$, does MNO i get reservation for sector j or not (modeling the combinatorial preferences)
$y_{ijk}$[Mbits/S], traffic reservation for MNO/MVNO i for sector j in time slot k
$r_{ijak}$ [Mbits/S], traffic reservation at access point a for MNO/MVNO i's sector j in time slot k The mixed integer programming MIP expression to be maximized is:

$$\max_{x,y,r} \underbrace{\sum_{i \in I} \sum_{j \in J} V_{ij} \cdot \frac{\sum_{k \in K} y_{ijk}}{D_{ij}}}_{\text{Value created from MNOs}} + \underbrace{\sum_{i \in I'} \sum_{j \in J} \sum_{k \in K} V'_i \cdot \frac{y_{ijk} \cdot L}{8 \cdot 1,000}}_{\text{Value created from MVNOs}} \quad \text{(MIP 1)}$$

The associated constraints are:

$y_{ijk} \leq x_{ij} \cdot D_{ijk} \forall i \in I, j \in J, k \in K$ [only reserve sth, if allocated, and nevermore than demand] (2)

$y_{ijk} \geq x_{ij} \cdot (D_{ijk} - F_{ijk}) \forall i \in I, j \in J, k \in K$ [if allocated, then don't reserve too little] (3)

$y_{ijk} = \Sigma_a r_{ijak} \forall i \in I \cup I', j \in J, k \in K$ [reserve as much as needed to satisfy demand] (4)

$r_{ijak} \leq T_{ijak} \cdot B_{ijak}^T \forall i \in I \cup I', j, k, a$ [don't reserve more than available traffic around $AP$] (5)

$\Sigma_{i,j} r_{ijak} \leq S_{ak} \cdot B_{ak}^S \forall a \in A, k \in K$ [don't reserve more at an $AP$ than available supply] (6)

Some of the parameters refer to values such as offloading demand from a particular MNO or an MVNO in a certain sector. These are the input numbers and received from the buyer candidates as part of their offload profile input to the system.

Another important parameter is the value for each of the MNOs in case they will get to offload and the necessary data traffic capacity in all of the time slots during a particular day. This input is received from each of the participating MNOs.

Similarly, for each of the MVNOs there is a value per gigabyte for getting to offload traffic to the alternative access network. In this version of the equation it is assumed that this value parameter is not dependent on the time or location. In an obvious straightforward extension of this solution it is possible to provide for value per gigabyte that depends on the time slots or their location or both.

Other parameters refer to predicted values such as supply available at a particular access point and a particular time or predicted traffic from each MNO/MVNO around an access point at a specific time. These parameters can be estimated from information from the supplier's home alternative network access and the buyers of the access through the system. However, in addition there is a source of information about these parameters in the form of the software application on each of the mobile devices that are participating in this mechanism to provide and manage data traffic offload to alternative access networks. This aspect of the solution and the associated components are described in the provisional patent application titled SYSTEMS AND METHODS FOR MANAGING OFFLOAD FROM ONE RADIO ACCESS NETWORK TO ANOTHER (U.S. Provisional Application No. 60/61/922,376, filed Dec. 31, 2013).

Other parameters, such as the capacity downwards tolerance and the volatility buffer are input parameters that can be estimated at the beginning of the operation and fine-tuned based on experiences of the system performance.

Once the values for all parameters have been established, a mixed integer programming approach is used to find the optimal reservations (see MIP 1). Well-known mathematical optimization software (e.g., CPLEX) is used to solve the mixed integer program resulting in the reservations for specific sector offload needs and specific traffic reservations for each of the access points participating in the allocation process.

The process of inputting the parameters is repeated, in this example, every day and it results in reservations for capacity for each of the timeslots in the day. Obviously, the time intervals for running the process and the number of timeslots within each interval for allocation can be said to be different from this example. Furthermore, the process can be automated in the sense that buyers and/or sellers do not need to input new parameters every day, but instead a user interface may be provided that allows them to specify their preferences for longer periods of time.

The foregoing systems and methods and associated devices and modules are susceptible to many variations. Additionally, for clarity and concision, many descriptions of the systems and methods have been simplified. For example, the figures generally illustrate one of each type of network device, but a network system may have many of each type of device.

As described in this specification, various systems and methods are described as working to optimize particular parameters, functions, or operations. This use of the term optimize does not necessarily mean optimize in an abstract theoretical or global sense. Rather, the systems and methods may work to improve performance using algorithms that are expected to improve performance in at least many common cases. For example, the systems and methods may work to optimize performance judged by particular functions or criteria. Similar terms like minimize or maximize are used in a like manner.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The various illustrative logical blocks, units, steps and modules described in connection with the embodiments disclosed herein can be implemented or performed with a processor, such as a general purpose processor, a multi-core processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules. Similarly, a first device may be described a transmitting data to (or receiving from) a second device when there are intermediary devices that couple the first and second device and also when the first device is unaware of the ultimate destination of the data.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter that is broadly contemplated by the present invention. It is further understood that the scope of the present invention fully encompasses other embodiments that may become obvious to those skilled in the art.

What is claimed is:

1. A method of allocating access to alternative access networks, the method comprising using at least one hardware processor to:
    receive first parameters representing a need of one or more operators of a primary network for access to bandwidth of an alternative network via a first interface, wherein the first parameters comprise an identification of a sector of the primary network and an offload profile indicating an amount of bandwidth needed for the identified sector over a time period;
    receive second parameters representing an available supply of bandwidth, during the time period, in the alternative network via a second interface;
    based on the first parameters and the second parameters, reserve, for the time period, at least a portion of the available supply of bandwidth in the alternative network to satisfy the need of the one or more operators for the access to bandwidth of the alternative network by at least
        comparing a network topology of the primary network to a network topology of the alternative network to identify at least one available access point that is in the alternative network and available within the identified sector of the primary network during the time period, and
        reserving, for the time period, at least a portion of a bandwidth capacity of the at least one available access point for the one or more operators based on the offload profile for the identified sector;
    allocate the reserved at least a portion of the available supply of bandwidth to the one or more operators for the time period; and,
    during the time period, offload one or more mobile devices, within the identified sector, from a base station of the primary network to the at least one available access point in the alternative network.

2. The method of claim 1, wherein the one or more operators comprise one or more of a mobile network operator, a mobile virtual network operator, a provider of content, and a provider of mobile device services.

3. The method of claim 1, wherein reserving at least a portion of the available supply of bandwidth in the alternative network comprises maximizing a solution to a mixed integer program expression.

4. The method of claim 3, wherein the mixed integer program expression comprises an offloading demand from the one or more operators in a certain sector of the primary network.

5. The method of claim 1, wherein one or both of the first interface and the second interface are an application programming interface.

6. The method of claim 1, wherein one or both of the first interface and the second interface are a user interface.

7. The method of claim 1, wherein the primary network is a cellular network, and the sector of the primary network is a cell of the cellular network.

8. The method of claim 1, wherein the first parameters comprise identifications of a plurality of sectors of the primary network, and wherein the offload profile indicates an amount of bandwidth needed for each of the plurality of sectors over the time period.

9. The method of claim 8, wherein the first parameters comprise an offload profile indicating an amount of bandwidth needed for each of the plurality of sectors over each of a plurality of time periods, and wherein the reservation for the time period comprises reservations for each of the plurality of time periods.

10. The method of claim 1, wherein the reservation for the time period is performed a plurality of months before the time period.

11. The method of claim 1, wherein the reservation for the time period is performed a plurality of weeks before the time period.

12. The method of claim 1, wherein the reservation for the time period is performed a plurality of days before the time period.

13. The method of claim 1, wherein the reservation for the time period is performed in real time.

14. A non-transitory computer readable medium having computer readable instructions stored thereon, wherein the instructions, when executed by a processor, cause the processor to:
    receive first parameters representing a need of one or more operators of a primary network for access to bandwidth of an alternative network via a first interface, wherein the first parameters comprise an identification of a sector of the primary network and an offload profile indicating an amount of bandwidth needed for the identified sector over a time period;
    receive second parameters representing an available supply of bandwidth, during the time period, in the alternative network via a second interface;

based on the first parameters and the second parameters, reserve, for the time period, at least a portion of the available supply of bandwidth in the alternative network to satisfy the need of the one or more operators for the access to bandwidth of the alternative network by at least comparing a network topology of the primary network to a network topology of the alternative network to identify at least one available access point that is in the alternative network and available within the identified sector of the primary network during the time period, and reserving, for the time period, at least a portion of a bandwidth capacity of the at least one available access point for the one or more operators based on the offload profile for the identified sector;

allocate the reserved at least a portion of the available supply to the one or more operators for the time period; and, during the time period, offload one or more mobile devices, within the identified sector, from a base station of the primary network to the at least one available access point in the alternative network.

15. The non-transitory computer readable medium of claim 14, wherein reserving at least a portion of the available supply of bandwidth in the alternative network comprises maximizing a solution to a mixed integer program expression.

16. The non-transitory computer readable medium of claim 15, wherein the mixed integer program expression comprises an offloading demand from the one or more operators in a certain sector of the primary network.

* * * * *